United States Patent
Faulkner et al.

(10) Patent No.: US 11,375,661 B2
(45) Date of Patent: Jul. 5, 2022

(54) COMBINE HARVESTER AND DISCHARGE ASSEMBLY OF THE SAME

(71) Applicant: Deere & Company, Moline, IL (US)

(72) Inventors: Christopher J. Faulkner, Eldridge, IA (US); Volker Fuchs, Bettendorf, IA (US); Corwin M. Puryk, Bettendorf, IA (US); Mark L. Mattson, East Moline, IL (US)

(73) Assignee: DEERE & COMPANY, Moline, IL (US)

( * ) Notice: Subject to any disclaimer, the term of this patent is extended or adjusted under 35 U.S.C. 154(b) by 894 days.

(21) Appl. No.: 15/785,098

(22) Filed: Oct. 16, 2017

(65) Prior Publication Data

US 2019/0110398 A1    Apr. 18, 2019

(51) Int. Cl.
| | |
|---|---|
| A01D 41/12 | (2006.01) |
| A01F 12/40 | (2006.01) |
| A01F 12/48 | (2006.01) |
| A01F 12/44 | (2006.01) |
| A01F 7/06 | (2006.01) |
| A01F 12/20 | (2006.01) |
| A01F 12/24 | (2006.01) |

(52) U.S. Cl.
CPC .......... *A01D 41/1243* (2013.01); *A01F 12/40* (2013.01); *A01F 12/48* (2013.01); *A01F 7/06* (2013.01); *A01F 12/20* (2013.01); *A01F 12/24* (2013.01); *A01F 12/444* (2013.01)

(58) Field of Classification Search
CPC ...... A01D 41/1243; A01F 12/40; A01F 12/48
See application file for complete search history.

(56) References Cited

U.S. PATENT DOCUMENTS

| | | | |
|---|---|---|---|
| 3,071,246 A | 1/1963 | Schimke | |
| 4,637,406 A * | 1/1987 | Guinn | ..................... A01F 12/40 241/101.71 |
| 6,354,938 B1 * | 3/2002 | Schrattenecker | ....... A01F 12/40 241/47 |

(Continued)

FOREIGN PATENT DOCUMENTS

EP    2340703 A1    7/2011

OTHER PUBLICATIONS

European Patent Office Extended Search Report for Application No. 18200442.4 dated Feb. 15, 2019 (6 pages).

*Primary Examiner* — Thomas B Will
*Assistant Examiner* — Joan D Misa
(74) *Attorney, Agent, or Firm* — Michael Best & Friedrich LLP

(57) ABSTRACT

A combine harvester includes a housing, a separating system mounted within the housing for separating a seed material from a straw material, a cleaning system including a cleaning fan configured to produce a motive flow of air, a straw chopper operable to chop the straw material from the separating system into a chopped straw material, a spreading system positioned downstream of the straw chopper and configured to disperse the chopped straw material outside of the housing of the combine harvester, and an air discharge channel located downstream of the straw chopper and above the spreading system and configured to discharge a portion of the motive flow of air produced by the cleaning fan.

19 Claims, 5 Drawing Sheets

(56) References Cited

U.S. PATENT DOCUMENTS

| | | | |
|---|---|---|---|
| 6,863,605 B2* | 3/2005 | Gryspeerdt | A01F 12/40 460/111 |
| 6,881,145 B2* | 4/2005 | Holmen | A01D 41/1243 460/112 |
| 6,893,340 B1 | 5/2005 | Schmidt et al. | |
| 6,908,379 B2* | 6/2005 | Gryspeerdt | A01D 41/1243 460/111 |
| 7,001,269 B2* | 2/2006 | Weichholdt | A01D 41/1243 460/112 |
| 7,008,315 B2 | 3/2006 | Redekop et al. | |
| 7,044,853 B2* | 5/2006 | Weichholdt | A01D 41/1243 460/112 |
| 7,066,810 B2* | 6/2006 | Farley | A01D 41/1243 460/112 |
| 7,220,179 B2* | 5/2007 | Redekop | A01D 41/1243 460/112 |
| 7,455,584 B2* | 11/2008 | Farley | A01D 41/1243 460/111 |
| 7,559,833 B2* | 7/2009 | Isaac | A01D 41/1243 460/111 |
| 7,651,391 B2* | 1/2010 | Weichholdt | A01D 41/1243 460/111 |
| 7,731,578 B2 | 6/2010 | Birrell et al. | |
| 7,927,200 B2* | 4/2011 | Van Overschelde | A01F 12/40 460/112 |
| 7,993,188 B2* | 8/2011 | Ritter | A01F 12/40 460/111 |
| 8,079,900 B2* | 12/2011 | Klein | A01D 41/1243 460/111 |
| 8,177,610 B2* | 5/2012 | Birrell | A01D 41/1243 460/111 |
| 8,616,945 B2 | 12/2013 | Ritter et al. | |
| 9,801,340 B2* | 10/2017 | Duquesne | A01D 41/1243 |
| 2007/0066370 A1 | 3/2007 | Redekop et al. | |
| 2007/0256403 A1 | 11/2007 | Teroerde et al. | |

\* cited by examiner a side view of a combine harvester.

COMBINE HARVESTER AND DISCHARGE ASSEMBLY OF THE SAME

BACKGROUND

The present disclosure relates to agricultural equipment, and more particularly to a combine harvester and the discharge assembly of a combine harvester.

SUMMARY

A combine harvester includes a housing, a separating system mounted within the housing for separating a seed material from a straw material, a cleaning system including a cleaning fan configured to produce a motive flow of air, a straw chopper operable to chop the straw material from the separating system into a chopped straw material, a spreading system positioned downstream of the straw chopper and configured to disperse the chopped straw material outside of the housing of the combine harvester, and an air discharge channel located downstream of the straw chopper and above the spreading system and configured to discharge a portion of the motive flow of air produced by the cleaning fan.

According to another embodiment, a combine harvester includes a housing, a separating system mounted within the housing for separating a seed material from a straw material, a spreading system including an inlet and at least one outlet configured to disperse the straw material outside of the housing of the combine harvester, and an air discharge channel including an air inlet positioned above the inlet of the spreading system, and an air outlet, wherein the channel defines a path extending upward from the air inlet and downward toward the air outlet between the air inlet and the air outlet.

According to yet another embodiment, a discharge assembly of a combine harvester includes a straw chopper operable to chop a straw material, a spreading system positioned downstream of the straw chopper and configured to discharge the straw material, and an air discharge channel located between the straw chopper and the spreading system.

Other features and aspects of the disclosure will become apparent by consideration of the following detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways. Also, it is to be understood that the phraseology and terminology used herein is for the purpose of description and should not be regarded as limiting.

DETAILED DESCRIPTION

Figure 1:
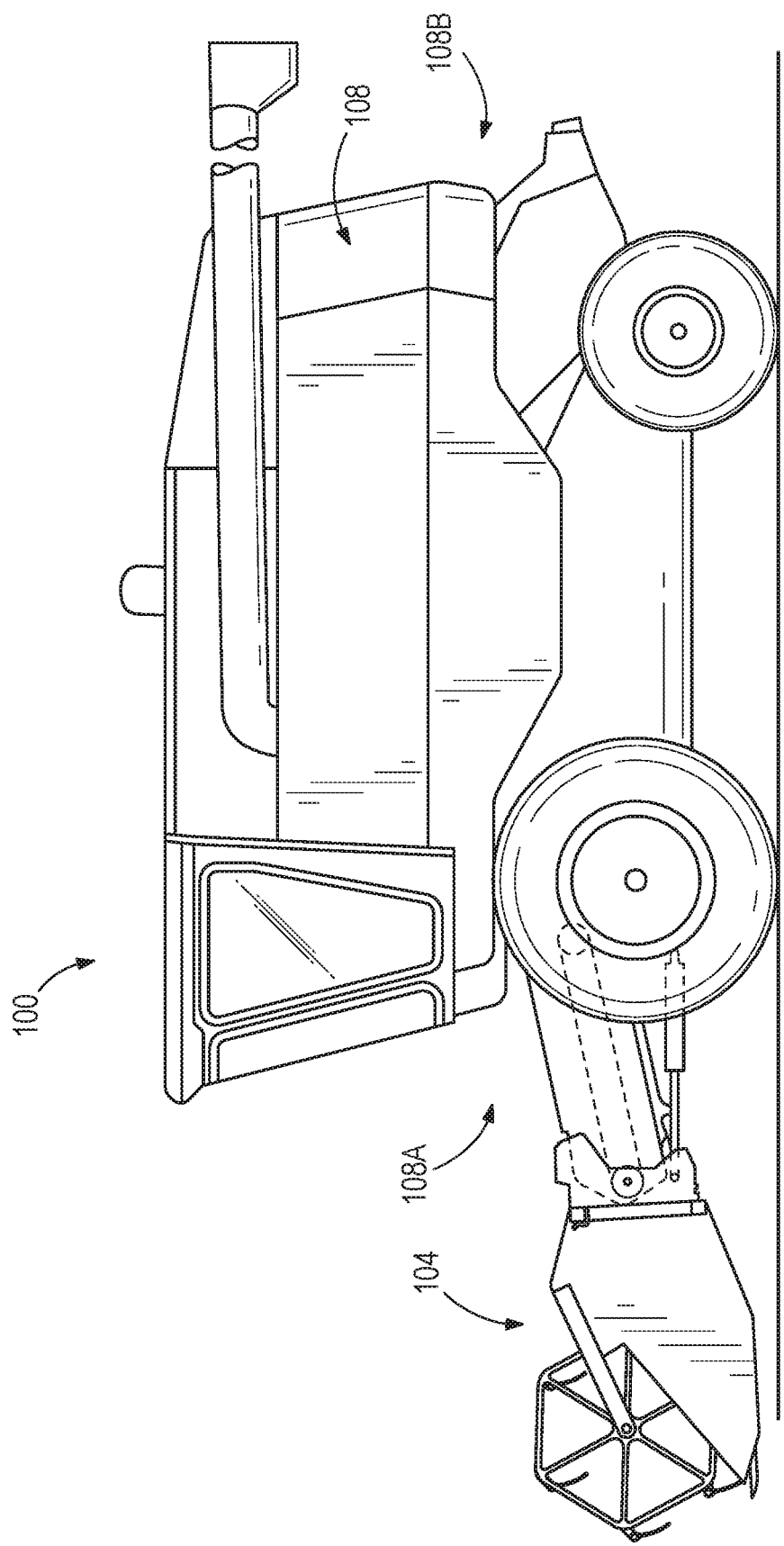
FIG. 1 is a side view of a combine harvester.

A combine harvester 100 (or simply "combine") is shown in FIG. 1. The combine 100 includes a head or grain platform 104 operable to cut or pick up pre-cut crops and feed the crops into a housing 108 of the combine 100. The housing extends from a housing front 108A at or near the grain platform 104 to a housing rear 108B, opposite the front 108A. Within the housing 108, the crops are threshed and stalk material or "straw" is removed or separated via a separating system 112 (FIGS. 2A-2B), leaving the crop grains that are to be collected and chaff which is to be removed in a cleaning operation so that cleaned grain can be discharged from the combine 100. The threshing and separating can be accomplished by any one of a variety of separating mechanisms.

Figure 2A:
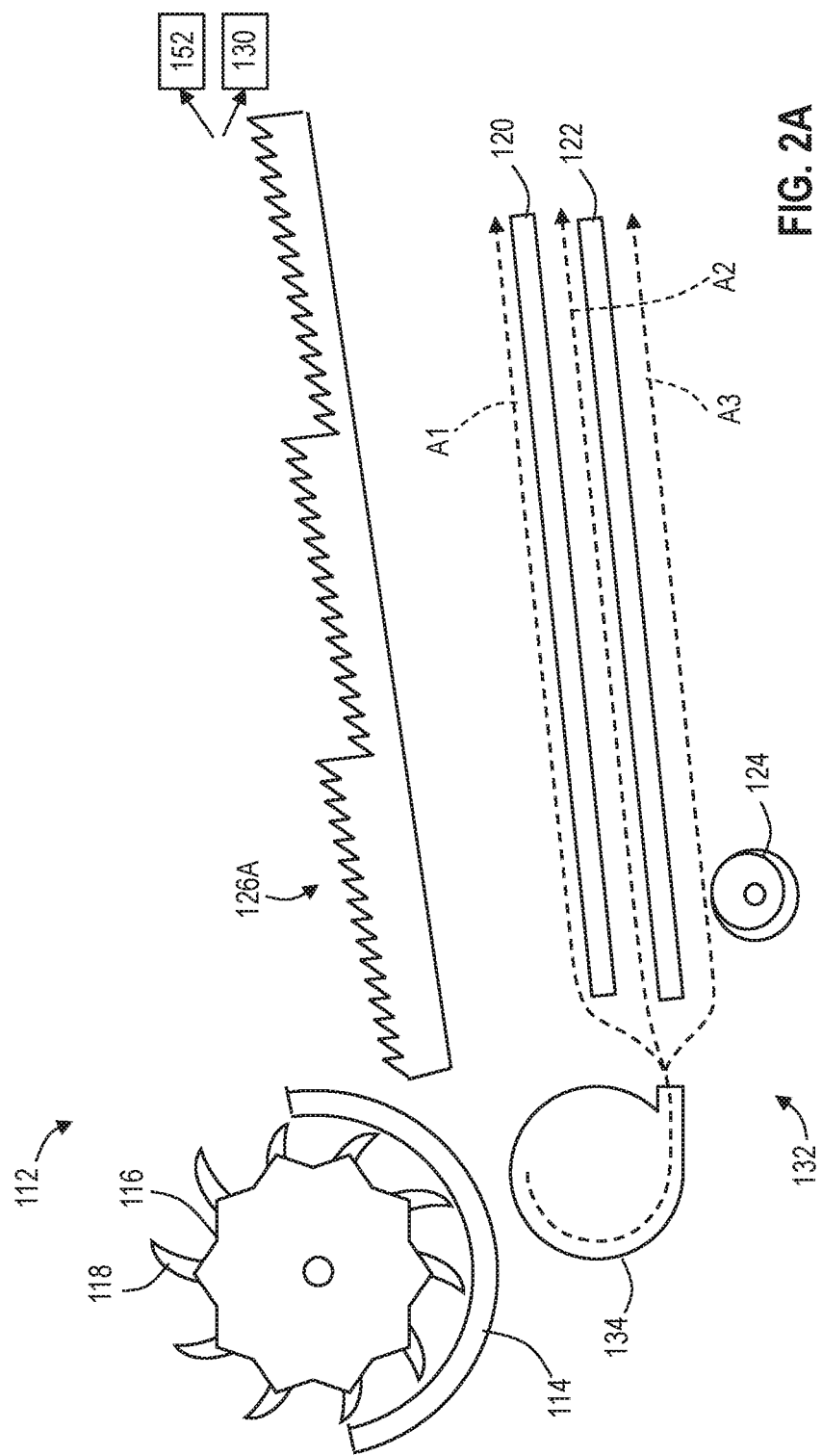
FIG. 2A is a schematic view of a cleaning system and a separating system including a straw walker of the combine harvester.
Figure 3A:
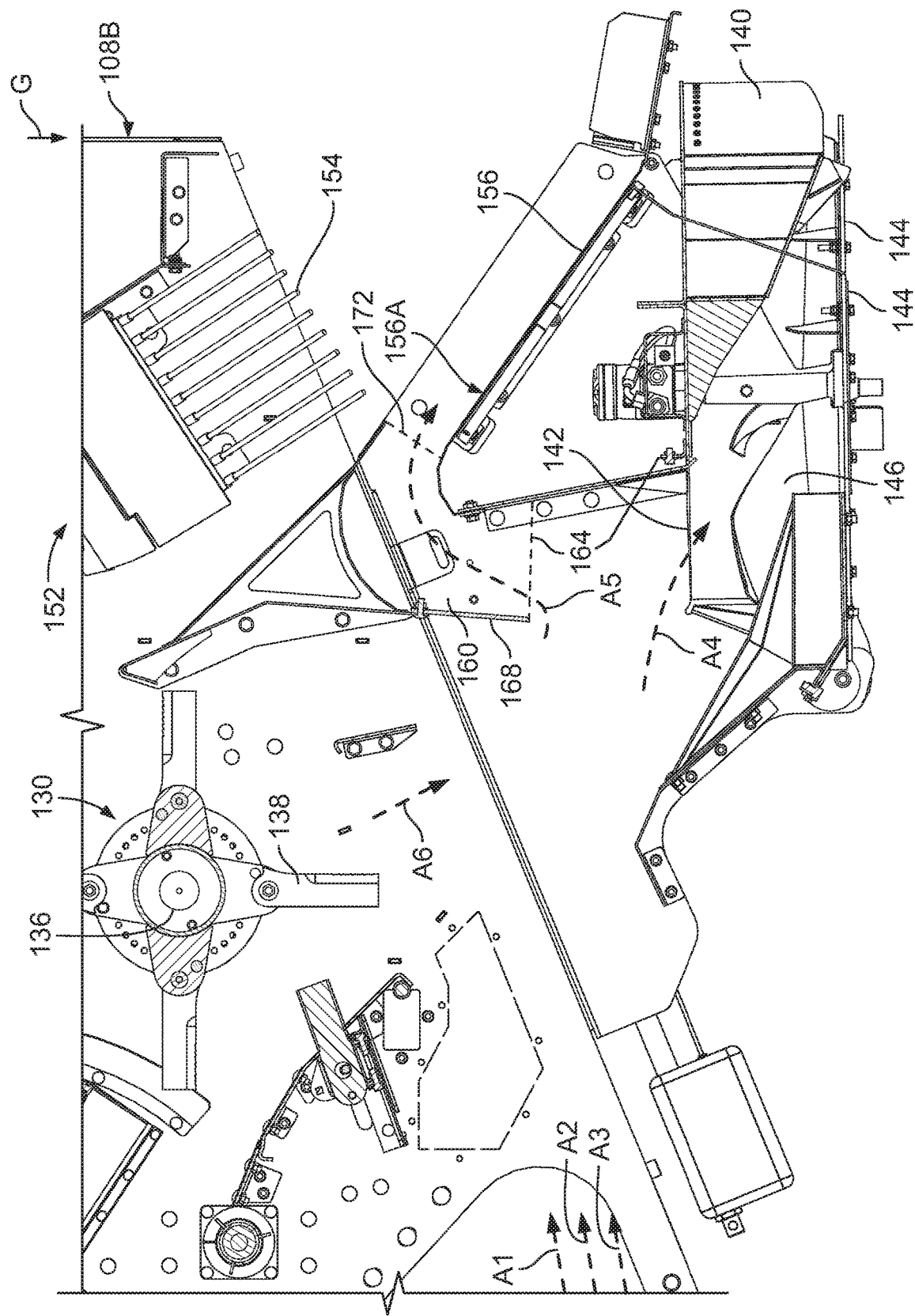
FIG. 3A is a partial cross-section of the cutting and discharge assembly of the combine harvester.
Figure 3B:
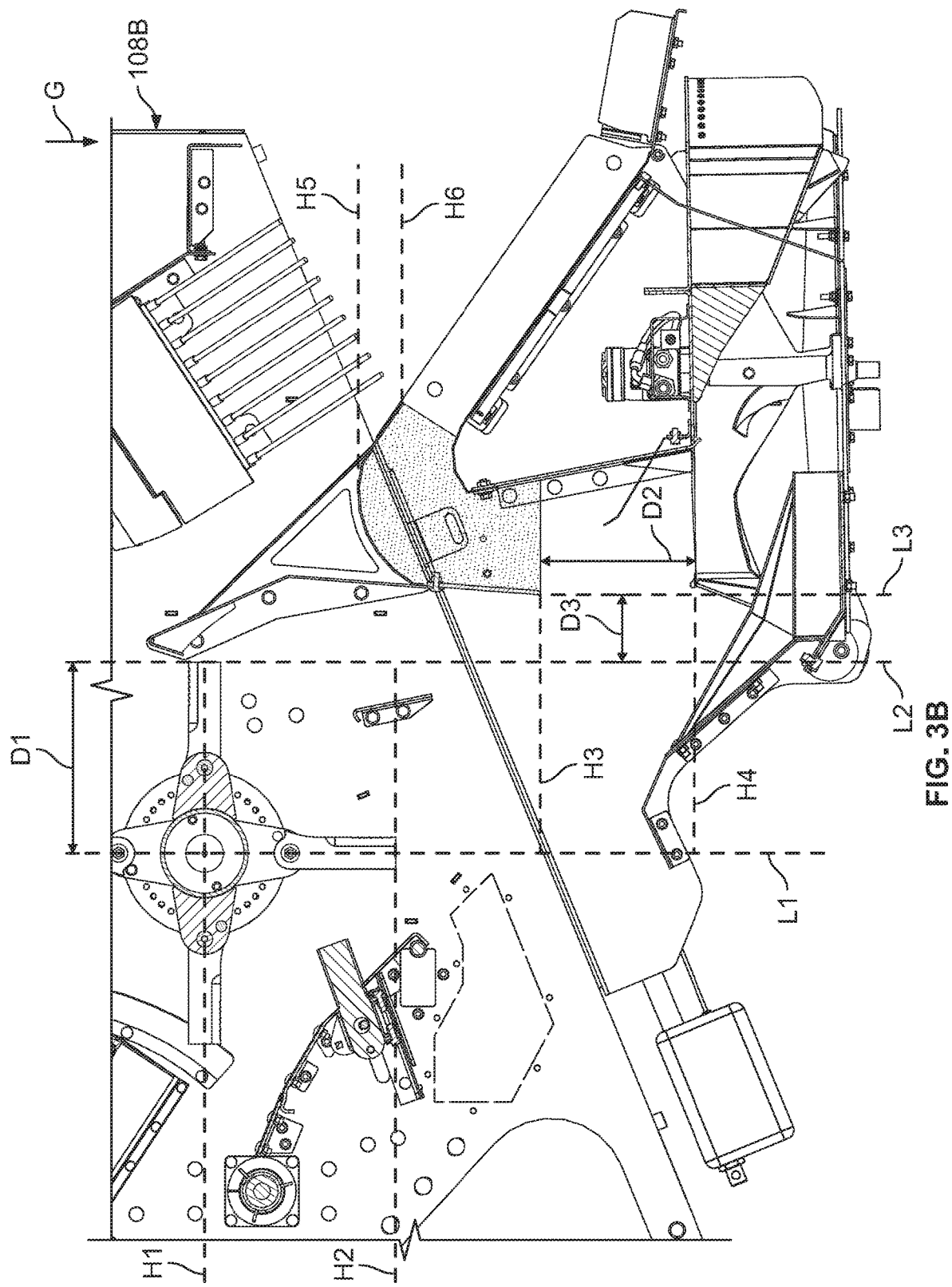
FIG. 3B is a partial cross-section of the cutting and discharge assembly of the combine harvester, with various placement annotations.

As shown in FIG. 2A, the separating system 112 is mounted within the housing of the combine 100 and includes a concave 114 and a threshing cylinder 116 having a plurality of rasp bars 118. Collectively, the concave 114 and the threshing cylinder 116 thresh the incoming crops to separate the grain from the straw, allowing the grain to fall through openings in the concave 114. A rear beater and a pre-threshing drum with a pre-concave (not shown) may additionally be used. From the threshing cylinder 116, the separated grain passes to a number of sieves (upper sieve or chaffer 120, and lower sieve 122) before being transported to a grain tank (not shown) via an auger 124. The straw advances to a straw walker 126A, where, because of its weight and length, the straw passes over the walker 126 to a straw chopper 130 or to a windrowing system 152 (FIGS. 3A-3B). Grain intermixed with the straw on the straw walker 126A passes through openings in the straw walker 126A due to the weight and size of the grain and from there continues to the sieves 120, 122, auger 124, and grain tank as previously described.

Figure 2B:
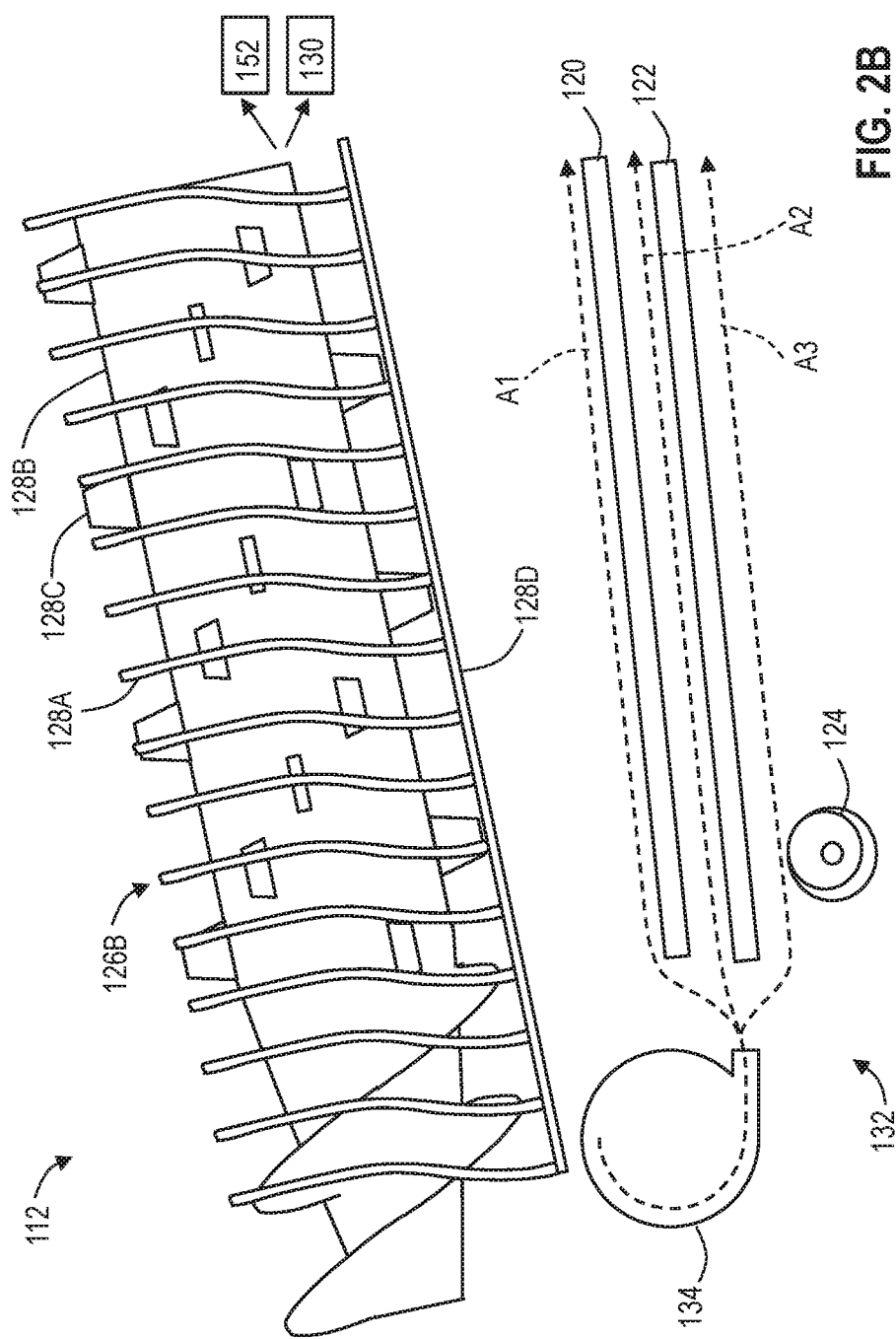
FIG. 2B is a schematic view of a cleaning system and a separating system including an axial rotary separator of the combine harvester.

Alternatively, as shown in FIG. 2B, the separating system 112 may include an axial rotary separator 126B. The rotary separator 126B moves the grain and straw from the front of the harvester 100 (i.e., from the cutter head assembly) towards the rear of the harvester 100. The rotary spreader 126B includes spiral vanes 128A to direct the crop in the rearward direction. The rotary separator 126B further includes a cylindrical body 128B supporting an arrangement of teeth 128C that penetrate the crop material, separating the grain from the straw material. The grain falls through a lower grate 128D to the chaffer 120, while the straw is carried to a rearward end of the rotary separator 126B. From there, the straw is directed toward either the windrowing system 152 or to the straw chopper 130.

As shown in FIGS. 2A, 2B, a cleaning system 132 includes a cleaning fan 134 and cleaning shoe elements including the chaffer 120 and the lower sieve 122. Though not shown, the cleaning system can also include a front chaffer, a return pan, and ducting between the fan and the cleaning shoe elements. The chaffer 120 and lower sieve 122 include louvers with openings defined therebetween. The grain falls through the openings where it is collected and transported to the grain tank via the auger 124. The airflow generated by the fan blows any chaff across the chaffer and sieve towards the rear 108B of the combine 100, as illustrated by arrows A1, A2, and A3. Although schematically illustrated with a single outlet, the cleaning fan 134 may include multiple outlets or may comprise multiple fans.

If it is desired to create a windrow (a trailing line of straw, left to dry) for later baling, the windrowing system 152 is utilized and the straw chopper 130 is not used to chop the straw. The windrowing system 152 includes a straw slide 156 along which the straw slides from the combine 100 to the ground behind the combine 100 (i.e., behind the rear 108B of the combine 100) and a windrow shaping system 154 including fingers for directing straw down the straw slide 156 and further directing an airflow for cleaning the straw slide 156.

If it is desired to chop the straw, the windrowing system 152 is unused and the straw chopper 130 is utilized to chop the straw. The straw chopper 130 is mounted within the housing 108 of the combine 100. Specifically, the straw chopper 130 includes a rotating shaft 136 that is drivable by a mechanical or hydraulic drive (not shown), and the shaft 136 is rotatably mounted to the housing 108 or to a component within the housing 108. The straw chopper 130 may include stationary knives and a plurality of rotating hammers mounted along a length of the rotating shaft 130. The rotating hammers push straw from the straw walker 126A to and through the stationary knives, thereby cutting or chopping the straw. Alternatively, as shown in FIG. 3A, the rotating shaft 130 may support a plurality of rotating knives or blades 138 at various intervals around the shaft 136 and arranged along a length of the shaft 136 (i.e., into the page as viewed in FIG. 3A) for chopping the straw to a smaller, more manageable size.

From the straw chopper 130, the straw and chaff is gravity-fed downward (the direction gravity acts when the combine 100 is on a flat surface is generally shown by arrow G) to a spreading system 140. The spreading system 140 is mounted below the chopper 130 (i.e., at a height below an outlet of the chopper 130) and rearward of the chopper 130 (i.e., an inlet 142 of the spreading system 140 is located further from the front 108A of the housing 108 of the combine 100 than the outlet of the chopper) such that the path from the outlet of the chopper 130 to the inlet 142 of the spreading system 140 is not a purely gravity-fed drop, as illustrated via arrow A6. The outlet of the chopper 130 is defined as the location where the chopped straw leaves the outer radius of the chopper 130. An air stream A1, A2, A3 from the cleaning system 132 may push the falling straw and chaff toward the inlet 142 of the spreading system 140 (as shown by arrow A4). The spreading system 140 disperses the straw from the combine 100 into the surrounding area (i.e. the field) outside of the combine 100. As shown in FIG. 3A, the spreading system 140 may be a rotary spreader with paddles 146 (e.g., rubber paddles) that push the chopped straw within the spreader 140 towards outlets 144 of the spreader 140. Further, the combine 100 may be provided with multiple (e.g., two) spreaders 140 located adjacent one another.

The airflow paths A1, A2, A3 from the cleaning system 132 move the chaff from the cleaning system 132 toward the spreading system 140 so that chaff from the cleaning system 132 is likewise ejected from the combine 100. The airflow A1, A2, A3 likewise assists in directing the straw from the straw chopper 130 towards the inlet 142 of the spreading system 140, which, is set back a distance D3 from the straw chopper 130.

With the fan speeds required to move chaff to the spreading system 140, the fan 134 can produce significant air speeds. Without proper ventilation, air pressure can build up in front of the ventilation channel 160 (i.e., at the chopper 130 and at the spreading system 140) and thereby decrease the efficiency of the cleaning system 132 and cleaning fan 134.

As shown in FIGS. 3A-3B, the combine 100 is provided with an air outlet, air discharge channel, aspiration channel, or ventilation channel 160 between the chopper 130 and the spreading system 140. The ventilation channel 160 is independent of the chopper 130 and the spreading system 140. The inlet 164 (inside the combine) of the ventilation channel 160 is positioned above the inlet 142 of the spreading system 140 at a height H3 and is spaced apart from the inlet 142 of the spreading system 140 (at a height H4) by a distance D2. The inlet 164 is further located rearward of the chopper 130 (i.e., nearer the rear 108B of the combine 100, at location L3) and is located at a height H3 that is lower than the chopper 130. Therefore, the inlet 164 may be located rearward of and at a height lower than the center of rotation of the chopper 130 (i.e., lower than height H1, rearward of location L1). Alternatively, the inlet 164 may be located rearward of a rearmost point L2 of the chopper 130 (i.e., at a radius D1 of the rotating blades 138 or hammers) and at a height that is lower than the lowest point H2 of the chopper 130 (i.e., at the radius D1 of the rotating blades 138 or hammers). The inlet 164 is further defined as being downstream and rearward of the cleaning system 132, and more particularly as being downstream and rearward of the air fan 134 and chaffer 120.

The inlet 164 is partially defined by a barrier wall 168 that extends between the straw flow path from the straw chopper 130 to the inlet 142 of the spreading system 140. The barrier wall 168 limits or prevents the passage of straw from the chopper 130 to the inlet 164 of the ventilation channel 160.

The ventilation channel 160 is further defined by an outlet 172, opposite the inlet 164 and open to the environment outside of the combine 100. More specifically, the outlet 172 of the ventilation channel is at or near the upper end 156A of the straw slide 156. Therefore, airflow through the outlet 172 of the ventilation channel 160 moves along the straw slide 156, thereby clearing debris (e.g., straw, chaff, dirt, etc.) from the straw slide 156 and eliminating the need for a separate air blast system 154. The outlet 172 of the ventilation channel 160 is located at a height H6 above the height H3 of the inlet 164. Alternatively, the height H6 of the outlet 172 may be equal to or below the height H3 of the inlet 164.

The path of the ventilation channel 160 between the inlet 164 and the outlet 172 extends upward (opposite the downward direction defined by arrow G) from the inlet and downward toward the outlet. As shown, the path is curvilinear or arched. Therefore, there is an apex (at height H5) between the inlet 164 and the outlet 172 at which the height H5 of the ventilation channel 160 is greater than the height H3 of the inlet 164 and the height H6 of the outlet 172. Alternatively, the path of the ventilation channel 160 may extend upward from the inlet 164 to the outlet 170 without an apex located therebetween. In either scenario, gravity-fed straw from the straw chopper will not fall into the inlet 164 of the ventilation channel 160, thereby preventing the ventilation channel 160 from clogging due to debris.

The ventilation channel 160 has a width (i.e., into/out of the page as shown in FIGS. 3A-3B) of the straw slide 156. Alternatively, the outlet 172 of the ventilation channel 160 may have a width to accommodate the width of the straw slide 156 with a width of the inlet 164 being narrower or broader. The cross-sectional area of the ventilation channel 160 may remain fairly consistent from the inlet 164 to the outlet 172, though it may narrow at the outlet 172 (e.g., as shown in FIG. 3B, the cross-sectional area of the ventilation channel 160 narrows by 30 to 50 percent) relative to the inlet 164.

In operation, air A1, A2, A3 from the cleaning fan 134 passes over the chaffer 120 and the lower sieve 122 to move chaff from the cleaning system 132 toward the rear 108B of the combine 100. The air picks up additional material (i.e., chopped straw) from the straw chopper 130 and moves the material to the spreading system 140. The material in the spreading system 140 exits with some of the airflow from the fan 134 through outlets 144 of the spreading system 140, as shown by arrow A4. The remainder of the airflow (plus any airflow resulting from pressure buildup at the front or inlet 164 of the ventilation channel 160) enters the inlet 164 of the ventilation channel 160, as shown by arrow A5. The barrier 168 that at least partially defines the inlet 164 prevents or limits impinging straw and chaff from entering the inlet 164. The airflow (along with dust and small particles) follows the circuitous, arched path to the outlet 172 of the ventilation channel 160, where the airflow moves over the straw slide 156, thereby removing debris from the straw slide 156, and relieving the airflow to the environment.

Various features of the disclosure are set forth in the following claims.

What is claimed is:

1. A combine harvester for harvesting a crop, the harvester comprising:
   a housing;
   a separating system contained within the housing for separating a seed material from a straw material of the crop;
   a cleaning system including a cleaning fan configured to produce a motive flow of air;
   a straw chopper operable to chop the straw material from the separating system into a chopped straw material;
   a spreading system positioned downstream of the straw chopper and configured to disperse the chopped straw material from the housing;
   an air discharge channel located downstream of the straw chopper and above the spreading system and configured to discharge a portion of the motive flow of air produced by the cleaning fan; and
   a barrier positioned downstream of the straw chopper to inhibit the chopped straw material from entering the discharge channel when the air discharge channel is configured to discharge the portion of the motive flow of air produced by the cleaning fan.

2. The combine harvester of claim 1, wherein the air discharge channel is at least partially defined by an upper wall, a lower wall, and the barrier, wherein the barrier extends from the upper wall into the housing between the straw chopper and the spreading system.

3. The combine harvester of claim 1, wherein the air discharge channel includes an inlet and an outlet, and wherein the air discharge channel extends upward from the inlet.

4. The combine harvester of claim 1, wherein the air discharge channel includes an inlet and an outlet, wherein the inlet is spaced from the spreading system.

5. The combine harvester of claim 1, wherein the cleaning system further comprises a chaffer, wherein the air discharge channel is located downstream of the chaffer.

6. The combine harvester of claim 1, wherein the spreading system includes an inlet, wherein the inlet is operable to receive the chopped straw material from the straw chopper, and wherein the inlet of the spreading system is located below the inlet of the air discharge channel.

7. The combine harvester of claim 1, wherein the housing of the combine harvester extends from a rear surface to a front surface in a direction of travel of the harvester, wherein the straw chopper is positioned a first distance from the rear surface of the housing, wherein the air discharge channel includes an inlet and an outlet, and wherein the inlet of the air discharge channel is positioned a second distance from the rear surface of the housing, the second distance being less than the first distance.

8. The combine harvester of claim 1, wherein the combine harvester includes a straw slide for use when windrowing straw, wherein the discharge channel includes an inlet and an outlet, and wherein the outlet is positioned upstream of the straw slide to discharge air over the straw slide.

9. A combine harvester comprising:
   a housing;
   a separating system mounted within the housing for separating a seed material from a straw material;
   a spreading system including an inlet and at least one outlet configured to disperse the straw material outside of the housing of the combine harvester; and
   an air discharge channel including an air inlet positioned above the inlet of the spreading system, and an air outlet,
   wherein the channel defines a path extending upward from the air inlet to inhibit the straw material from entering the air inlet and downward toward the air outlet between the air inlet and the air outlet.

10. The combine harvester of claim 9, further comprising a straw chopper operable to chop the straw material from the separating system into a chopped straw material, wherein the air inlet is positioned downstream of the straw chopper.

11. The combine harvester of claim 10, wherein the air discharge channel is at least partially defined by a barrier positioned between the straw chopper and the air inlet.

12. The combine harvester of claim 9, further comprising a cleaning system including a chaffer and a cleaning fan configured to produce an air flow, wherein the air discharge channel is located downstream of the cleaning system and is configured to discharge at least a portion of the air flow.

13. The combine harvester of claim 9, wherein the air inlet is located at a first height, the air outlet is located at a second height, and the arched path reaches a third height greater than the first height and the second height.

14. The combine harvester of claim 9, wherein the air outlet directs an airflow from the air discharge channel to a straw slide.

15. The combine harvester of claim 9, wherein the path is a curvilinear path.

16. A discharge assembly of a combine harvester, the discharge assembly comprising:
   a straw chopper located within a housing of the combine harvester and operable to chop a straw material;
   a spreading system positioned downstream of the straw chopper and configured to discharge the straw material through a first outlet; and
   an air discharge channel located between the straw chopper and the spreading system, the air discharge channel configured to discharge an airflow separate from the straw material through a second outlet when the spreading system is configured to discharge the straw material through the first outlet.

17. The discharge assembly of claim 16, further comprising a windrowing system including a straw slide, wherein in a first mode the discharge assembly is configured to direct straw material to the windrowing system, and wherein in a second mode the discharge assembly is configured to direct straw material to the straw chopper and the spreading system and the airflow extends through the discharge channel to the straw slide.

18. The discharge assembly of claim 16, wherein the air discharge channel extends in a path upward from an inlet of the air discharge channel and downward toward the second outlet.

19. The discharge assembly of claim 18, wherein the inlet of the discharge channel is oriented to direct the airflow vertically.

* * * * *